Patented July 29, 1930

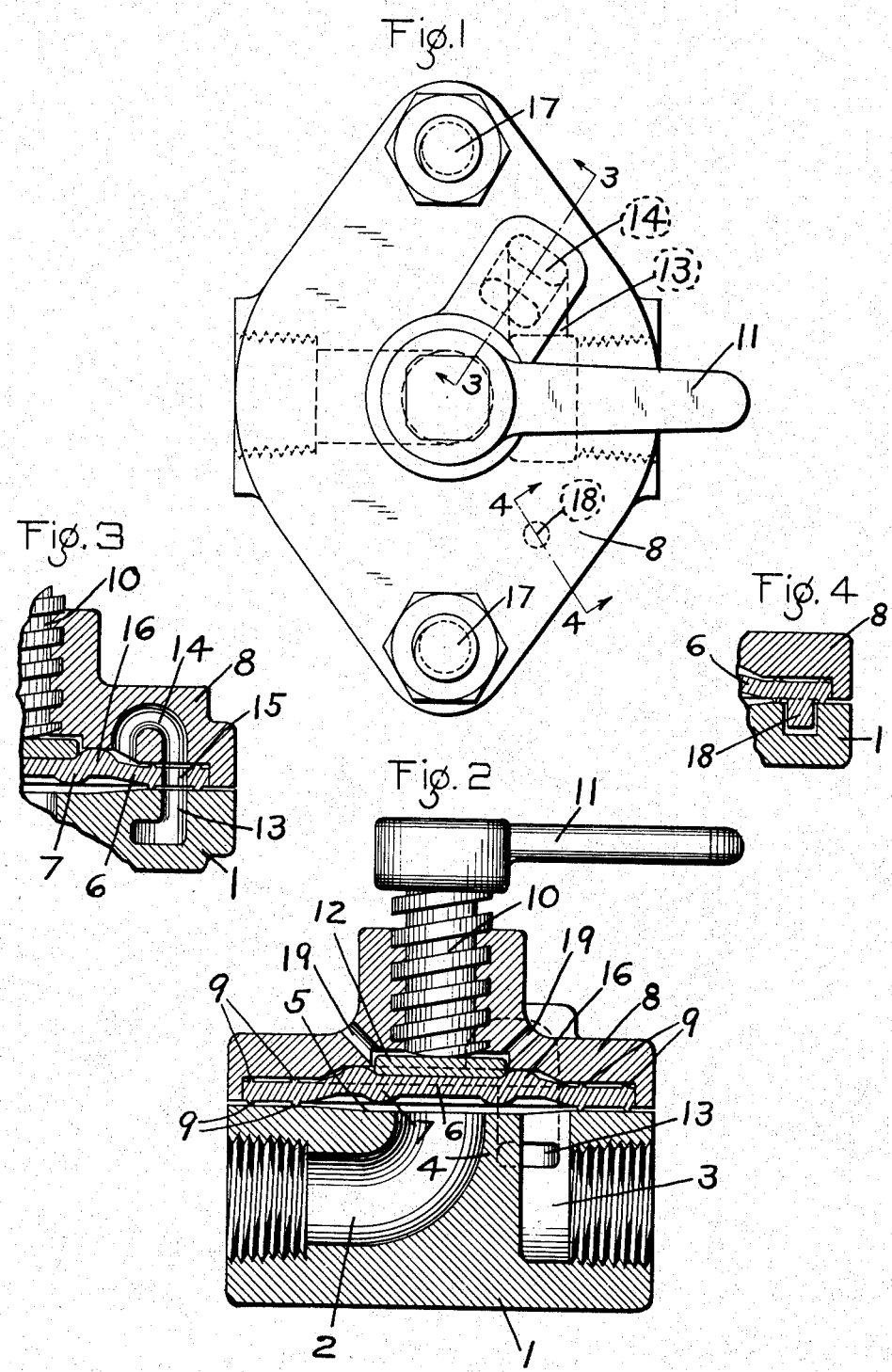

1,771,410

UNITED STATES PATENT OFFICE

WILLIAM C. LANDIS, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

VALVE DEVICE

Application filed November 19, 1928. Serial No. 320,284.

This invention relates to hand operated valves and one object of the invention is to provide a hand operated valve device, in which the possibility of leakage is reduced to a minimum.

Another object of my invention is to provide a hand operated valve device having a flexible diaphragm acting as a valve for controlling the supply of fluid pressure to and its release from an outlet conduit.

In the accompanying drawings: Fig. 1 is a plan view of a valve device embodying my invention; Fig. 2 is a central sectional view of the improved valve device; Fig. 3 a section on the line 3—3 of Fig. 1; and Fig. 4 a section on the line 4—4 of Fig. 1.

The valve device may comprise a valve body 1 having passageways 2 and 3 with a dividing wall 4 separating said passages. The passageway 2 leads to a seat 5 and mounted above said seat is a flexible diaphragm 6, preferably made of a rubber composition and having an annular seat rib 7 adapted to engage the seat 5.

The diaphragm 6 is clamped in place by a cap member 8, having a circular recess adapted to receive the diaphragm, the diaphragm being provided with annular ribs 9 on its opposite sides, to ensure a leak tight joint when the cap member is clamped to the valve body.

A threaded stem 10 has screw-threaded engagement in the cap member 8 and is provided with an operating handle 11. The inner rounded end of the stem bears against a pressure plate 12, which plate engages the upper face of the diaphragm 6.

The under face of the cap member 8 is centrally recessed to provide a valve seat on which an annular seat rib 16 of the diaphragm 6 is adapted to engage.

Connected to the outlet passage 3 of the valve device is a cored passage 13, which is adapted to connect with a cored passage 14, in the cap member 8, through an opening 15 in the diaphragm. The passage 14 opens into the space at the outer side of the seat rib 16.

The valve body 1 is provided with oppositely extending lugs having openings to receive clamping bolts 17, by which the cap member 8 is clamped to the valve body 1.

In order to ensure registration of the opening 15 with the passage 13, the diaphragm 6 is provided with a teat 18, adapted to engage in a corresponding recess drilled in the valve body. This projecting teat also prevents the diaphragm from being applied the wrong side up.

Passages 19 in the cap member 8, connect the space above the diaphragm 6, within the seat rib 16 with the atmosphere.

When the diaphragm 6 is in its upper position, as shown in Fig. 2, communication is established from passage 2 to passage 3, and if fluid under pressure is present in passage 2, a flow of fluid takes place to the passage 3.

The pressure of fluid acting on the under face of the diaphragm presses the seat rib 16 into tight engagement with its seat, and consequently leakage of fluid from passage 3 through the passages 13 and 14 is prevented while the diaphragm 6 is in its open position.

When the handle 11 is operated to rotate the stem 10 so as to move the diaphragm 6 to cause the seat rib 7 to engage the seat 5, flow of fluid from passage 2 to passage 3 is cut off and the movement of the diaphragm also causes the seat rib 16 to move away from its seat. Passage 3 is then connected to the atmosphere by way of passages 13 and 14 and the passages 19.

It will thus be seen that the diaphragm 6 acts both as a fluid pressure supply valve and as a release valve.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. A valve device comprising a valve body having a valve seat, a non-metallic flexible diaphragm having a seat rib adapted to engage said seat, and manually operable means for flexing said diaphragm to engage said seat.

2. A valve device comprising a valve body having a valve seat, a cap member having a valve seat, a flexible diaphragm interposed between said body and said member and having a seat rib on each side for engaging the corresponding seat, and means for flexing said diaphragm.

3. A valve device comprising a valve body having an inlet conduit and an outlet conduit, a cap member and a flexible diaphragm interposed between said cap member and said valve body, said diaphragm being movable to one position for cutting off communication from the inlet conduit to the outlet conduit and for connecting the outlet conduit with the atmosphere and movable to another position for cutting off communication from the outlet conduit to the atmosphere and for connecting the outlet conduit with the inlet conduit.

4. A valve device comprising a valve body having an inlet conduit and an outlet conduit, a cap member having a valve seat and an atmospheric port, a flexible diaphragm interposed between said valve body and said cap member, said diaphragm being movable to one position in which communication from the inlet conduit to the outlet conduit is established and in which the diaphragm engages the valve seat in the cap member to cut off communication from the outlet conduit to said atmospheric port in the cap member and movable to another position in which communication is opened from the outlet passage to the atmospheric port and in which the diaphragm engages the valve seat of the valve body to cut off communication from the inlet conduit to the outlet conduit.

5. A valve device comprising a valve body having a valve seat, a cap member, a flexible diaphragm interposed between said valve body and said member and adapted to engage said seat, a teat carried by said diaphragm engaging a recess in the valve body, and manually operable means for flexing said diaphragm to engage said seat.

In testimony whereof I have hereunto set my hand, this 16th day of November, 1928.

WILLIAM C. LANDIS.